United States Patent
Bunch et al.

[11] Patent Number: 6,007,666
[45] Date of Patent: Dec. 28, 1999

[54] PROCESS FOR MANUFACTURING LAMINATED WRAPPING PAPER

[75] Inventors: Joseph A. Bunch, Shorewood; Volney M. Bunch, Joliet, both of Ill.

[73] Assignee: General Packaging Products Inc., Chicago, Ill.

[21] Appl. No.: 08/915,040

[22] Filed: Aug. 20, 1997

[51] Int. Cl.[6] ............................. B32B 7/04; B32B 9/06; B32B 31/12; B32B 31/20

[52] U.S. Cl. .................... 156/280; 156/277; 156/290; 156/291; 156/292; 156/308.4; 229/87.08; 428/34.3; 428/35.4; 428/36.6; 428/486

[58] Field of Search ................................. 156/277, 278, 156/280, 290, 291, 292, 308.4, 553; 428/35.4, 34.3, 36.6, 486; 229/87.08, 87.09, 87.11

[56] References Cited

U.S. PATENT DOCUMENTS

| | | |
|---|---|---|
| 2,084,026 | 6/1937 | Gurwick . |
| 2,115,318 | 4/1938 | Rosen . |
| 2,155,057 | 4/1939 | Moore . |
| 2,314,876 | 3/1943 | Greene . |
| 2,610,939 | 9/1952 | Fisher et al. ........................ 428/487 |
| 2,865,769 | 12/1958 | Jacke . |
| 2,956,042 | 10/1960 | Underwood . |
| 3,036,987 | 5/1962 | Ranalli . |
| 3,096,014 | 7/1963 | Swan . |
| 3,231,462 | 1/1966 | Oswald et al. ...................... 428/486 |
| 3,288,353 | 11/1966 | McCullough . |
| 3,365,116 | 1/1968 | Ludlow . |
| 3,399,819 | 9/1968 | Rennie et al. . |
| 3,505,083 | 4/1970 | Schelhorn . |
| 3,536,644 | 10/1970 | Frizelle . |
| 3,642,550 | 2/1972 | Doll . |
| 3,663,488 | 5/1972 | Kail . |
| 3,707,393 | 12/1972 | McDonald . |
| 3,865,664 | 2/1975 | Neumann ........................ 156/277 X |
| 3,961,119 | 6/1976 | Thomas . |
| 4,081,580 | 3/1978 | Kato . |
| 4,235,657 | 11/1980 | Greenman et al. . |
| 4,252,846 | 2/1981 | Romesberg et al. . |
| 4,263,360 | 4/1981 | Adelman . |

(List continued on next page.)

FOREIGN PATENT DOCUMENTS

| | | |
|---|---|---|
| 1 162 730 | 2/1984 | Canada . |
| 0 288 227 A2 | 10/1988 | European Pat. Off. . |

OTHER PUBLICATIONS

J. Shields, *Adhesives Handbook*, Sira Institute Ltd 1976, pp. 2, 48–49.

Irving Skeist, *Handbook of Adhesives*, Skeist Laboratories, Inc. 1977, pp. ix–xxi, 5, 225–226, 269, 327, 413.

Technical Information SHX 800, Shorko Films/Courtaulds Films, May 1, 1990.

Epolene Waxes, Low–Molecular–Weight Polyolefin resins for Industrial Applications.

*Primary Examiner*—Adrienne C. Johnstone
*Attorney, Agent, or Firm*—Wallenstein & Wagner, Ltd.

[57] ABSTRACT

According to the present invention, a laminar wrapping paper is provided comprising first and second paper layers or laminae. Each lamina has an inside surface coated with a barrier coating. The layers are laminated by heat lamination, wherein the barrier coatings are melted together, or by providing an adhesive between the coated inside surfaces. The lamination may be accomplished in a selective or discontinuous manner in order to form air pockets within the laminar structure to increase the insulation characteristics of the wrapping paper. A plasticizer is applied to the outside surface of the first lamina. Graphic designs or lettering may be printed on the outside surface to identify the wrapped product or for purposes of decoration. The present invention is also directed at a process and apparatus for manufacturing the laminar wrapping paper described herein. First and second webs of paper are unrolled and passed through coating apparatus to coat one side of each web with a barrier coating. An adhesive is applied to one of the coated sides of the webs to laminate the webs together, or alternatively heat lamination is performed using a hot roll. A plasticizer is then applied to the outer side of the first web.

3 Claims, 2 Drawing Sheets

U.S. PATENT DOCUMENTS

| | | |
|---|---|---|
| 4,265,949 | 5/1981 | Kugimiya . |
| 4,270,658 | 6/1981 | Schuster . |
| 4,320,162 | 3/1982 | Schulz . |
| 4,481,243 | 11/1984 | Allen . |
| 4,487,796 | 12/1984 | Lloyd et al. . |
| 4,515,840 | 5/1985 | Gatward . |
| 4,575,000 | 3/1986 | Gordon et al. . |
| 4,600,629 | 7/1986 | Knapp et al. . |
| 4,606,951 | 8/1986 | Wakasugi et al. . |
| 4,629,064 | 12/1986 | Barner . |
| 4,630,733 | 12/1986 | Fear . |
| 4,735,846 | 4/1988 | Larsonneur . |
| 4,750,668 | 6/1988 | Behne et al. . |
| 4,758,500 | 7/1988 | Schober et al. ................... 430/309 |
| 4,786,533 | 11/1988 | Crass et al. . |
| 4,842,187 | 6/1989 | Janocha et al. . |
| 4,863,781 | 9/1989 | Kronzer . |
| 4,865,854 | 9/1989 | Larson . |
| 4,880,696 | 11/1989 | Yanidis . |
| 4,885,202 | 12/1989 | Lloyd et al. . |
| 4,935,276 | 6/1990 | Pawlowski et al. . |
| 4,978,565 | 12/1990 | Pigneul et al. . |
| 4,984,907 | 1/1991 | Power . |
| 5,027,946 | 7/1991 | Parsons . |
| 5,055,332 | 10/1991 | Rhodes et al. . |
| 5,098,497 | 3/1992 | Brinley . |
| 5,120,585 | 6/1992 | Sutter et al. . |
| 5,126,382 | 6/1992 | Hollenberg . |
| 5,128,182 | 7/1992 | Bunker et al. . |
| 5,128,183 | 7/1992 | Buzio . |
| 5,194,315 | 3/1993 | Itoh . |
| 5,241,149 | 8/1993 | Watanabe et al. . |
| 5,310,587 | 5/1994 | Akahori et al. . |
| 5,346,312 | 9/1994 | Mabry et al. . |
| 5,376,392 | 12/1994 | Ikegami et al. . |
| 5,399,366 | 3/1995 | Geddes et al. . |
| 5,456,968 | 10/1995 | Jones . |
| 5,480,693 | 1/1996 | Patterson et al. . |
| 5,560,945 | 10/1996 | Geddes et al. . |
| 5,582,674 | 12/1996 | Patterson et al. . |
| 5,585,129 | 12/1996 | Geddes et al. . |
| 5,609,901 | 3/1997 | Geddes et al. . |
| 5,658,622 | 8/1997 | Berlin et al. ........................... 428/36.6 |

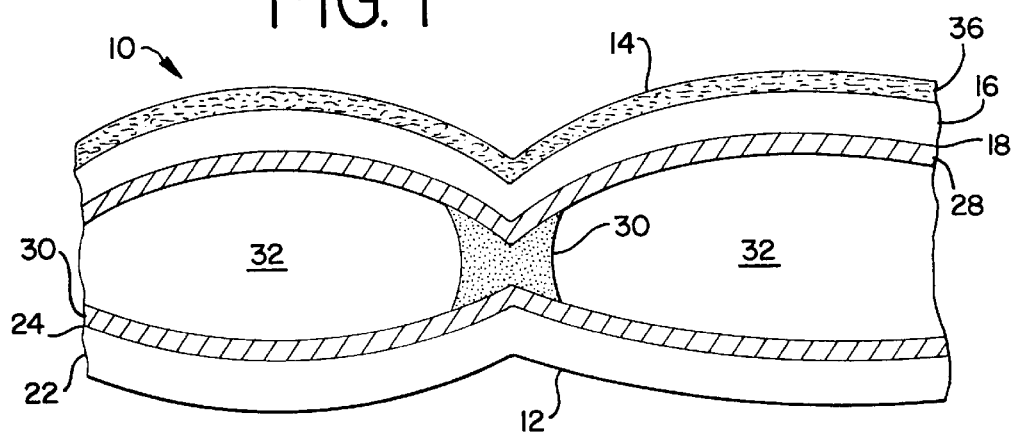
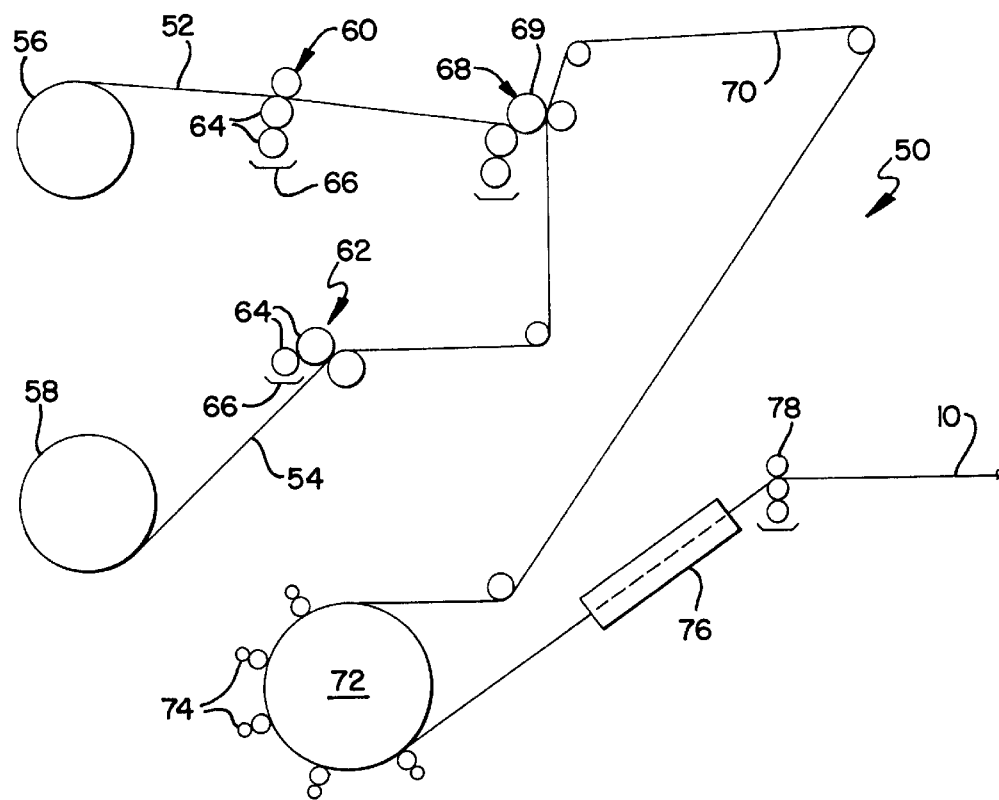

PROCESS FOR MANUFACTURING LAMINATED WRAPPING PAPER

TECHNICAL FIELD

The present invention generally relates to laminated paper products and, more particularly, to laminated paper suitable for packaging food products.

BACKGROUND OF THE INVENTION

Laminated paper wrapping has a variety of uses in the packaging industry. Many cost-efficient processes have been developed for producing stable wrappings consisting of cellulose- and foil-based layers bonded or adhered together. In the food wrapping industry, and particularly in the case of heated foods, several performance criteria should be met. The wrapping should have superior insulation properties in order to retain heat within the packaging for an acceptable period of time. Superior moisture retention is also desirable. In addition, an important criterion is the deadfold characteristics of the wrapping—that is, the ability of the wrapping once deformed around a food item to resist springing back or unwrapping.

These performance criteria have for the most part been achieved in foil and foil-to-paper wrappings. For many applications or situations, however, the use of foil is not desirable. One such instance is where microwave heating is contemplated, which is, of course, incompatible with metal foil. In addition, foil is more expensive than paper and as a waste product does not degrade satisfactorily. But while paper-to-paper wrappings are often favored, the deadfold, insulating and moisture retention properties of such products have thus far been less than satisfactory. As previously indicated, the "natural memory" inherent in paper tends to cause a paper-to-paper laminate to unfold after being wrapped around a food product.

With this background in mind, it is an object of the present invention to produce a paper-to-paper laminated wrapping which emulates the superior performance criteria of foil wrappings.

SUMMARY OF THE INVENTION

The aspects of the present invention may be summarized as follows. A laminar wrapping paper is provided comprising first and second paper layers or laminae. Each lamina has an inside surface coated with a barrier coating. The layers are laminated by heat lamination, wherein the barrier coatings are melted together, or by providing an adhesive between the coated inside surfaces. The lamination may be accomplished in a selective or discontinuous manner in order to form air pockets within the laminar structure to increase the insulation characteristics of the wrapping paper. A plasticizer is applied to the outside surface of the first lamina. Graphic designs or lettering may be printed on the outside surface to identify the wrapped product or for purposes of decoration.

The present invention is also directed at a process for manufacturing the laminar wrapping paper described herein and apparatus for carrying out the process. First and second webs of paper are unrolled and passed through a coating apparatus to coat one side of each web with a barrier coating. The webs are then laminated by either heat lamination or adhesive application. In heat lamination, a hot roll is used to melt the barrier coatings. Alternatively, an adhesive is applied to the coated side of one of the webs to laminate the webs together. A plasticizer is then applied to the outer side of the first web.

Other features and advantages of the invention will be apparent from the following specification taken in conjunction with the following drawings.

BRIEF DESCRIPTION OF THE DRAWINGS

FIG. 1 is a side view of an embodiment of the present invention illustrating the locations of the various layers and coatings;

DETAILED DESCRIPTION OF THE PREFERRED EMBODIMENT

Figure 2:
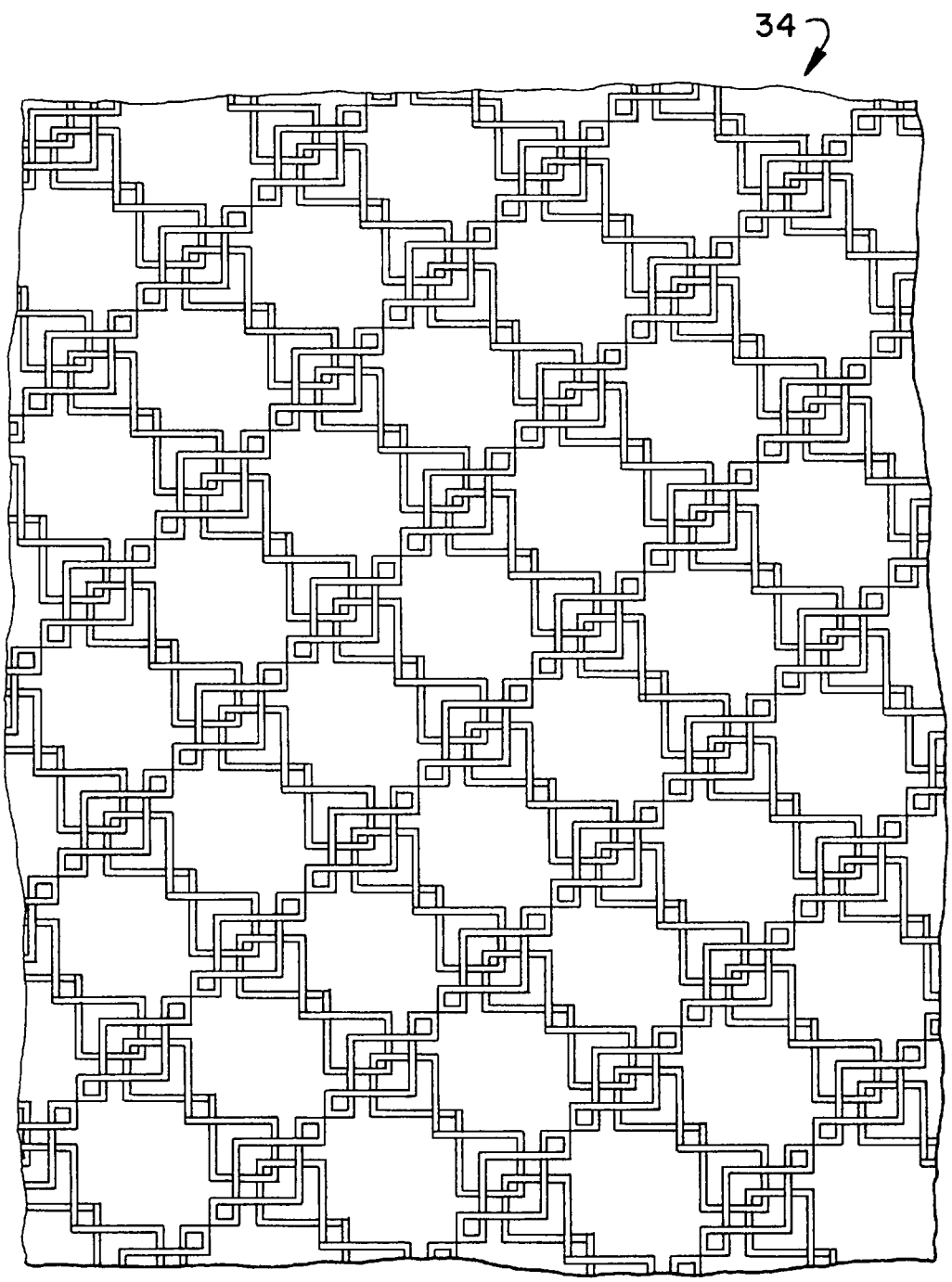
FIG. 2 shows an adhesive pattern applied to the laminae of the present invention; and, FIG. 3 is a schematic illustrating a process for manufacturing the embodiment of FIG. 1.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspects of the invention to the embodiments illustrated.

FIG. 1 shows in cross-sectional view a preferred embodiment of the finished laminar wrapping paper 10 of the present invention. The wrapping paper 10 generally comprises upper and lower laminae 16,22, a dual barrier coating consisting of upper and lower barrier coating layers 28,30, and a plasticizer layer or film 36. An inside surface 12 of the wrapping paper 10 is exposed to the food product while an outside surface 14 is exposed to ambient conditions. The upper lamina 16 and lower lamina 22 are cellulose-based or paper materials and constitute the major structural layers of the wrapping paper 10. The lamina material is preferably a 12–20 lb. basis weight machine glaze or MG with high density and opacity.

Inner surfaces 18,24 of each lamina 16,22 are respectively coated with a barrier coating layer 28,30. The preferred barrier coating material is a blend of paraffin with a melt point in the range of 127–135° F., microcrislin with a melt point between 135–160° F., epoline, and BHT. Individually, these constituents are known to those skilled in the art and are readily obtainable on the market. Microcrislin is a hydrocarbon-based wax that is malleable and increases the deadfold property of the wrapping paper 10. Epoline is a polymer selected to increase moisture retention. BHT, butylated hydroxytoluene (2,6-di-t-butyl-p-cresol), is an antioxidant that prevents the barrier coating layers 28,30 from degrading or becoming rancid. In addition to providing improved moisture retention and deadfold characteristics, the barrier coating layers 28,30 prevent greases, free fats and oils from migrating from the wrapped food product to the outer surface 14 of the wrapping paper 10. In effect, fats and oils are attracted away from the wrapped food product through a capillary or wicking action and captured in the lower lamina 22 without affecting the exterior appearance of the wrapping paper 10. As a result, the moisture retention capability of the wrapping paper 10 is superior to that of fluorocarbon treated laminae of the prior art.

The upper and lower laminae 16,22 are laminated together by means of two alternative approaches. In the first approach, an appropriately selected emulsion adhesive 31 is employed. While in some applications it is advisable to apply the adhesive 31 to an entire side of the laminae 16,22, FIG. 2 illustrates a preferred pattern adhesive application that creates air pockets or dead zones 32. In the second approach, the upper and lower laminae 16,22 are heat laminated without the use of a separate adhesive. Essentially, the second approach entails melting the waxes of the two barrier coatings 28,30 together, as is described below. Heat lamination results in the creation of air pockets 32 as well. The use of air pockets 32 greatly increases the insulating property of the wrapping paper 10. The insulating property is even more enhanced by using the dual barrier coating layers 28,30 described above, which greatly reduce the air permeability of the laminae 16,22 and ensure that air will be trapped within the dead zones 32 to an extent not found in prior art structures having a single polyethylene layer. FIG. 2 shows a preferred pattern 34 for the adhesive application or heat lamination, although it will be understood that other patterns such as a rectangular grid or other geometric pattern may be suitable as well.

The plasticizer film 36 is applied to an outer surface 20 of the upper lamina 16 to fill in voids in the lamina 16. The plasticizer 36 is essentially a wetting agent containing both water and an evaporation-inhibiting agent, and it raises the moisture level of the upper lamina 16 only. A plasticizer 36 comprising 55% water and 45% glycol or glycerine has been found suitable for the present embodiment. However, it will be understood that many other kinds of plasticizer compounds may be found to have comparable efficacy without undue experimentation. The plasticizer 36 acts as a stabilizing agent and tends to fill the cells or voids of the cellulosic upper lamina 16. In addition, application of the plasticizer 36 essentially creates a tension between the upper and lower laminae 16,22. These properties, along with those of the dual barrier coating 28,30, operate to successfully overcome the natural memory inherent in the laminae 16,22 and thus dramatically improve the deadfold property of the wrapping paper 10.

In order to improve the appearance of the wrapping paper 10 or identify the contents therein, the upper lamina 16 may have designs or textual information printed thereon before application of the plasticizer 36.

A preferred method for manufacturing the wrapping paper 10 will now be described with reference to FIG. 3, which is a simplified diagram depicting an apparatus 50 used for processing the wrapping paper 10. Upper and lower webs of paper 52,54 are unwound off of two rolls 56,58. Each web 52,54 has at least one smooth machine grade or glazed side. Each of the webs 52,54 is then passed through a respective barrier coating station 60,62. Each barrier coating station 60,62 has a series of cylinders 64 which conduct the coating material from holding trays 66 to the machine grade side of each web 52,54. The webs are preferably coated at a rate of 2–4 lbs/ream. The coated webs 52,54 are then passed through a lamination deck 68. The lamination deck 68 applies the pattern adhesive using a flexographic process with air trapping dies. As an alternative to using pattern adhesive application, heat lamination may be used wherein one of the rolls of the lamination deck 68 is a hot pattern roll 69. The heat from the hot pattern roll 69 melts the barrier coatings 28,30 together according to a pattern 34 similar to that accomplished by the adhesive application, as shown in FIG. 2. The laminated structure 70 is then sent to a printing unit 72 containing a number of printing stations 74, where printed matter is inked onto the upper web 52 of lamination 70. The lamination 70 is passed through a series of dryers 76 and then a wetting unit 78 where the plasticizer 36 is applied. At this point, the resulting wrapping paper 10 is ready to be sized, stored or shipped as appropriate.

While specific embodiments have been illustrated and described, numerous modifications come to mind without significantly departing from the spirit of the invention, and the scope of protection is only limited by the scope of the accompanying claims.

What is claimed is:

1. A process for manufacturing a laminar wrapping paper comprising the steps of:

passing a first web of paper through a first coating apparatus to apply a first barrier coating to a first side of the first web;

passing a second web of paper through a second coating apparatus to apply a second barrier coating to a second side of the second web, wherein the first and second barrier coatings are a blend of wax, a polymer, and an anti-oxidant, such blend including paraffin, microcrislin, epoline, and BHT;

laminating the first and second sides together by employing a hot pattern roll to melt the first and second barrier coatings together to create a plurality of air pockets between the first and second sides; and applying a plasticizer as a wetting agent including water and an evaporation inhibiting agent to an outer side of the first web.

2. The process of claim 1 wherein the evaporation inhibiting agent is glycol.

3. The process of claim 1 wherein the evaporation inhibiting agent is glycerine.

* * * * *